(12) United States Patent
Khan

(10) Patent No.: US 7,738,423 B2
(45) Date of Patent: Jun. 15, 2010

(54) CELL SWITCHING AND PACKET COMBINING IN A WIRELESS COMMUNICATION SYSTEM

(75) Inventor: Farooq Ullah Khan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1361 days.

(21) Appl. No.: 10/888,559

(22) Filed: Jul. 9, 2004

(65) Prior Publication Data

US 2006/0007889 A1 Jan. 12, 2006

(51) Int. Cl.
 *G06F 15/16* (2006.01)
(52) U.S. Cl. .................... 370/331; 455/436
(58) Field of Classification Search ............ 455/433, 455/436, 437, 440; 370/331, 332
 See application file for complete search history.

(56) References Cited

U.S. PATENT DOCUMENTS

| 6,496,493 | B1* | 12/2002 | Chung | 370/332 |
| 7,263,371 | B2* | 8/2007 | Das et al. | 455/456.1 |
| 2003/0078044 | A1* | 4/2003 | Leung | 455/436 |
| 2003/0169705 | A1 | 9/2003 | Knisely et al. | 370/332 |
| 2005/0020295 | A1* | 1/2005 | Attar et al. | 455/522 |

FOREIGN PATENT DOCUMENTS

| EP | 1313232 | 5/2003 |
| GB | 1 349 292 A2 | 1/2003 |
| WO | WO 98/35525 | 8/1998 |

OTHER PUBLICATIONS

International European Search Report (EP 05 25 4150) dated Aug. 26, 2005.
European Search Report EP 05 25 4150 dated Nov. 3, 2005.
Lucent Technologies, Inc. "Downlink and Uplink Structures for HSDPA" 3GPP TSG RAN WG 1, Nov. 21, 2000, pp. 1-7 XP002206395.

* cited by examiner

*Primary Examiner*—Sam Bhattacharya
(74) *Attorney, Agent, or Firm*—Williams, Morgan & Amerson, PC

(57) ABSTRACT

A method is provided to allow a mobile station to communicate with two different cells during a handoff between the cells. During the handoff, the mobile station may controllably combine information received from both of the cells with which it is communicating.

18 Claims, 7 Drawing Sheets

CELL SWITCHING AND PACKET COMBINING IN A WIRELESS COMMUNICATION SYSTEM

BACKGROUND OF THE INVENTION

1. Field of the Invention

This invention relates generally to telecommunications, and more particularly, to wireless communications.

2. Description of the Related Art

In evolving wireless data systems, such as the well-known 1×EV-DO and 1×EV-DV standards, as well as the High Speed Downlink Packet Access (HSDPA) specification in the Universal Mobile Telecommunication System (UMTS) standard, the Forward link (base station to mobile station) scheduling function has been moved from a radio network controller (RNC) to the base station (BS) to provide "fast" scheduling based on channel quality feedback from the users. Moreover, new technologies such as adaptive modulation and coding (AMC) and hybrid ARQ (HARQ) have also been introduced to improve the overall system capacity. In general, a scheduler selects a user for transmission at a given time and adaptive modulation and coding allows selection of the appropriate transport format (modulation and coding) for the current channel conditions seen by the user. Due to errors in channel quality estimates, a relatively high level of frame errors may occur in the transmissions performed at a given rate (transport format). Hybrid ARQ makes use of fast retransmissions and combines the newly received copy of the transmission with the previously received copy to recover from transmission errors without a significant loss in throughput.

In a CDMA cellular system, a mobile station can be in soft handoff with cells in the same cell site (softer handoff) or with cells in different cell sites (soft handoff). For voice or circuit switched data communication, a mobile station may be in soft/softer handoff both on the uplink (mobile to base) and downlink (base to mobile). However, for packet data services, it has been found that a higher capacity can be achieved if the mobile station communicates only with the best cell on the downlink. Such an approach called SSDT (Site Selection Diversity Transmit power control) is adopted in the Universal Mobile Telecommunication system (UMTS) standard. In the case of SSDT, the best cell is reported to the network using physical-layer (DPCCH) signaling with a maximum rate of 500 Hz. In SSDT, the mobile station selects one of the cells from an active set to be "primary;" all other cells are classed as "non-primary." The main objective is to transmit on the downlink from the primary cell, thus reducing the interference caused by multiple transmissions in a soft handover mode. A second objective is to achieve fast site selection without network intervention, thus maintaining the advantage of the soft handoff. To select a primary cell, each cell is assigned a temporary identification (ID) and the mobile station periodically transmits a primary cell ID to the connecting cells. The non-primary cells selected by the mobile station switch off their transmission power, thereby avoiding interference from multiple transmissions. The primary cell ID is delivered by the mobile station to the active cells via an uplink Feedback Information (FBI) field. Moreover, SSDT activation, SSDT termination and Cell Identification (ID) assignment are all carried out by higher layer signaling.

Other wireless standards like 1×EV-DO and 1×EV-DV support Fast Cell Selection (FCS). The FCS approach is similar to the SSDT approach in UMTS. In the 1×EV-DO system, for example, a DRC (Data Rate Control) Channel is used by the mobile station to indicate to the access network the selected serving sector and the requested data rate on the Forward Traffic Channel. The requested Forward Traffic Channel data rate is mapped into a four-bit DRC value. An 8-ary Walsh function corresponding to the selected serving sector is used to spread the DRC Channel transmission. The 8-ary Walsh function ensures that only the selected sector (cell) can successfully decode the DRC. The successful decoding of the DRC indicates that the cell has been selected for transmission.

An example of the fast cell selection process in a 1×EV-DO system is depicted in FIG. 1. The mobile station selects cell-1 between time instants T1 and T2 by addressing the DRC to cell-1. At time T2, the mobile station decides to switch to cell-2 and transmits DRC with cell-2 Walsh cover. After successfully receiving the DRC, cell-2 can start scheduling the mobile station. Due to the use of the Walsh cover, only the selected cell can successfully decode the DRC and subsequently schedule the mobile station for transmission.

In general, a mobile station can select any of the cells in its active set for downlink transmission. The cells in the active set are added and deleted based on the downlink received signal quality. To reduce the delay, the data destined for the mobile station is forwarded to all the cells in the active set on the backhaul network from the Radio Network Controller (RNC). A cell can then transmit data to the mobile station as soon as the mobile station selects this cell. If the data is not forwarded to all the cells in the active set, there can be additional delay associated with forwarding data to the new cell before the new cell can start transmission to the mobile station.

In the cell selection approaches used in the prior art, a mobile station is communicating with only a single base station at a given time. This limited ability to communicate with only a single base station at a given time results in interrupted communications during cell switching. The interruption in communication may result in loss of data or additional delays that affect the performance of delay sensitive applications such as Voice over Internet Protocol (VoIP) and wireless multi-party gaming.

The present invention is directed to overcoming, or at least reducing, the effects of, one or more of the problems set forth above.

SUMMARY OF THE INVENTION

In one embodiment of the present invention, a method is provided. The method comprises switching from communicating with a first cell to communicating with a second cell, and receiving information from both the first and second cells for a preselected period during the switching.

In another embodiment of the present invention, a method is provided. The method comprises receiving information only from a first cell; switching from communicating with the first cell to communicating with a second cell; receiving information from both the first and second cells for a preselected period during the switching; and receiving information only from the second cell after the switching.

In still another embodiment of the present invention, a method is provided. The method comprises switching from communicating with a mobile station via a first cell to communicating with the mobile station via a second cell, and transmitting information from both the first and second cells for a preselected period during the switching.

BRIEF DESCRIPTION OF THE DRAWINGS

The invention may be understood by reference to the following description taken in conjunction with the accompanying drawings, in which like reference numerals identify like elements, and in which.

Figure 1:
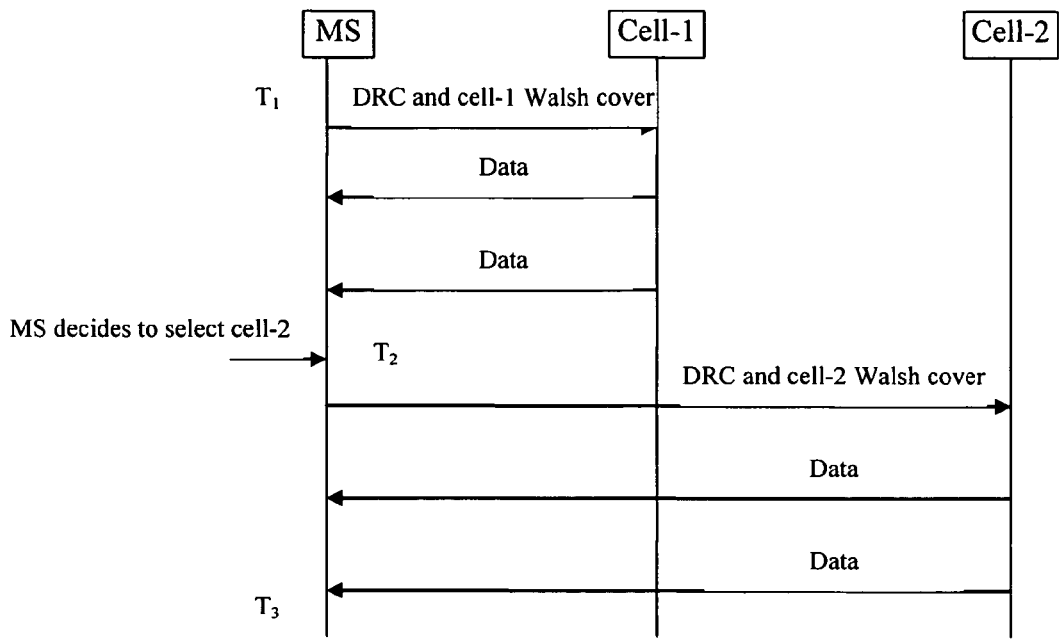
FIG. 1 illustrates a stylized representation of fast cell selection operation in a 1×EV-DO system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention discloses an approach where a mobile station can be in communication with more than one cell for a relatively brief period of time while performing a cell selection operation. Further, during a period of time in which cell switching occurs, Hybrid ARQ combining across cells may be used to improve performance.

Figure 2:
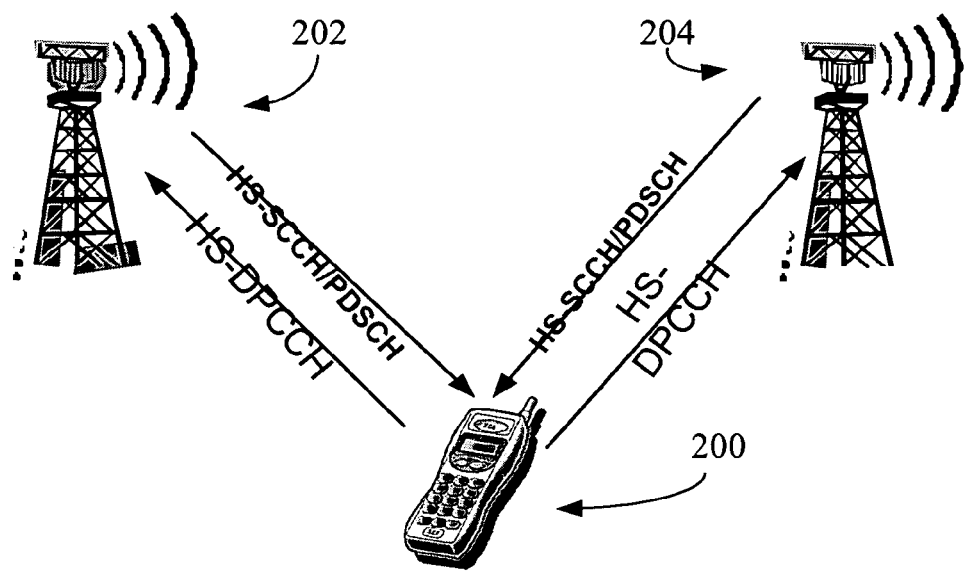
FIG. 2 illustrates a stylized representation of cell switching where a mobile station is in communication with two cells.

While the instant invention is described in the context of an HSDPA system in the embodiments disclosed herein, those skilled in the art will appreciate that the principles of the instant invention apply to other wireless systems, such as 1×EV-DO, 1×EV-DV, IEEE 802.16, etc. An exemplary embodiment of the instant invention in which a mobile station 200 or User Equipment (UE) communicates with two cells 202, 204 simultaneously is shown in FIG. 2. While the cells 202, 204 are stylistically illustrated as towers, those skilled in the art will appreciate that cells are commonly composed of a variety of components, including, for example, a base station, a Node b, and other transceiver structures. During the cell selection process, the mobile station 200 listens to a High Speed Shared Control Channel (HS-SCCH) and a High Speed Physical Downlink Shared Channel (HS-PDSCH) from both the "old cell" 202 and the "new cell" 204. A High Speed Dedicated Physical Control Channel (HS-DPCCH) carrying both the Channel Quality Indicator (CQI) and ACK/NACK feedback from the mobile station 200 is decoded at both the cells 202, 204 as well.

Figure 3:
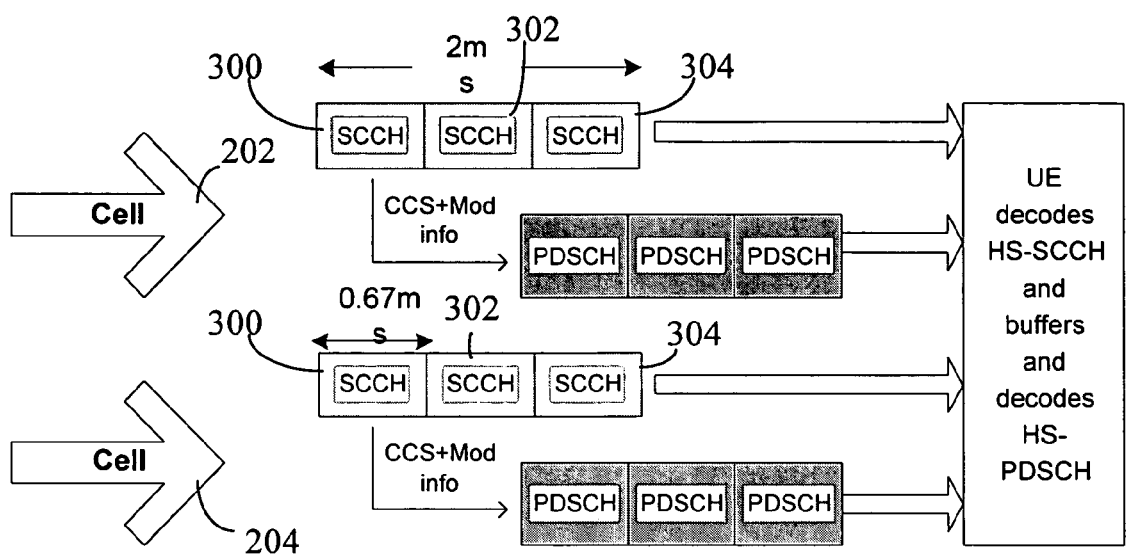
FIG. 3 illustrates a stylized representation of a mobile station decoding HS-SCCH and buffering and decoding HS-PDSCH.

A timing relationship between the HS-SCCH and HS-PDSCH channels is shown in FIG. 3. The HS-SCCH carries control information, such as coding and modulation, Hybrid ARQ, control, etc. The HS-SCCH Transmission Time Intervals (TTI) consists of three slots (2ms). The first slot carries a Channelization Code Set (CCS) and modulation information. After receiving the first slot 300 of HS-SCCH, the mobile station 200 starts buffering the HS-PDSCH. Decoding of the HS-PDSCH happens only after the mobile station 200 has received all three of the slots 300-304 of the HS-SCCH because other control information that may be needed for PDSCH decoding may be carried in the remaining two slots 302, 304.

Figure 4:
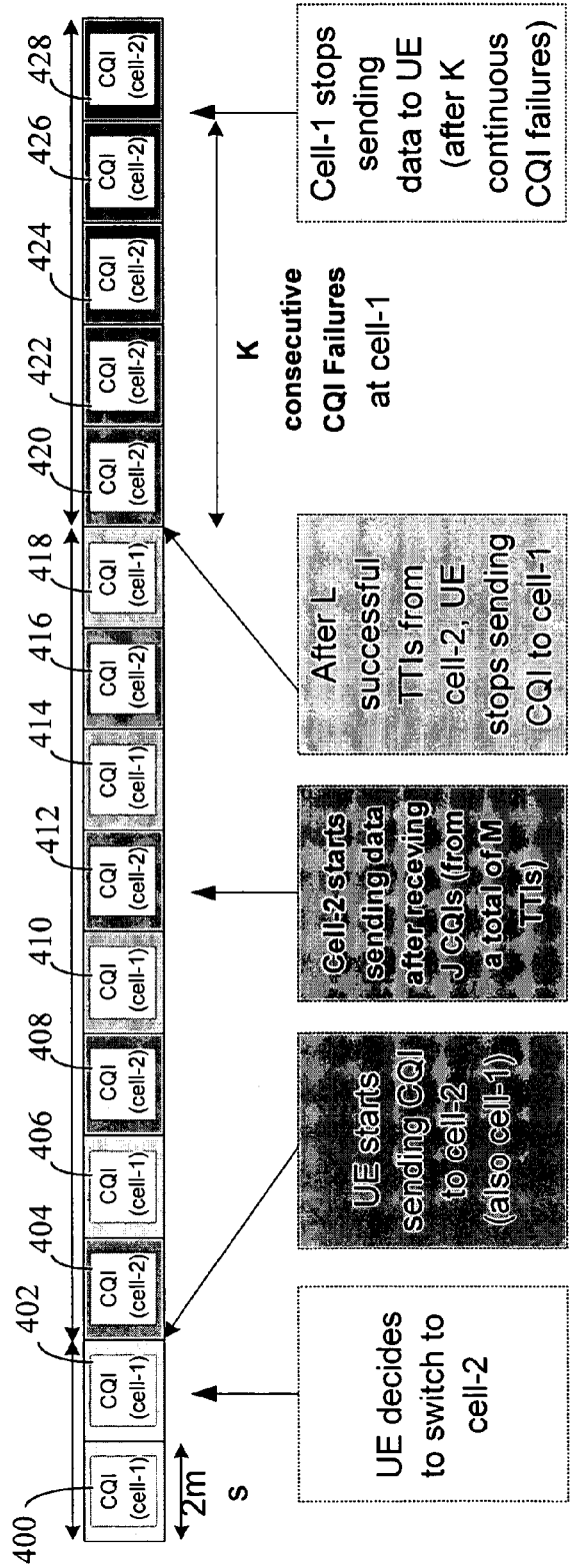
FIG. 4 illustrates a stylized representation of a cell switching operation in one embodiment of the instant invention.

A stylized representation of the cell switching operation in one embodiment of the invention is shown in FIG. 4. The mobile station 200 performs a cell selection from the old cell 202 to the new cell 204 in its active set. Ordinarily, the data for the mobile station 200 is forwarded to both the cells 202, 204 on the backhaul network connecting the cells 202, 204 with the RNC. When the mobile station 200 is in communication with the old cell 202, the channel quality feedback (CQI) is only targeted for the old cell 202, as indicated by slots 400-402. At a time when the mobile station 200 decides to switch to the new cell 204, the mobile station 200 starts sending CQI to the new cell 204, as indicated by slots 404, 408, 412, 416. At the same time, the mobile station 200 continues to send CQI to the old cell 202, as indicated by the slots 406, 410, 414, 418 because the mobile station 200 continues to receive data from the old cell 202. The CQI feedback for the two cells 202, 204 can be time-multiplexed on the same HS-DPCCH channel, as indicated by slots 404-418. Moreover, the CQI information can be scrambled or covered by a cell specific code so that only the cell for which the CQI is targeted can decode it. For example, the CQI transmitted in the slot 408 may be encoded such that the new cell 204 may properly decode the CQI, but the old cell 202 cannot. When the new cell 204 receives a preselected number (J) of successfully decoded CQIs, it starts sending data to the mobile station 200. In this state, the mobile station 200 can potentially receive data both from the old cell 202 and the new cell 204. After successfully receiving a preselected number (L) of Transmission Time Intervals (TTIs) from the new cell 204, the mobile station 200 stops sending CQIs to the old cell 202, as indicated at slots 420 428. The old cell 202 then stops sending data to the mobile station 200 after a preselected number (K) of consecutive failures to receive CQIs from the mobile station 200. Note that the old cell 202 is not able to decode CQI targeted for the new cell 204 because the CQI information is scrambled with a new cell 204 specific code.

In another embodiment of the present invention, the new cell 204 sends a signal to the old cell 202 via the backhaul network that the new cell 204 has been selected by the mobile station 200 as the serving cell. The old cell 202 can then stop sending data to the mobile station 200. The parameters J, K and L are, of course, configurable based on the characteristics of the system. The values for these parameters can be chosen based on, for example, a desired level of cell selection reliability. For example, a small value for the parameter K (consecutive CQI failures before the old cell 202 stops sending data to the mobile station 200) may result in less wasted resources in some cases, but in some applications, the mobile station 200 may not receive data from either cell if there are some occasional errors on the CQI channel. Conversely, a large value for the K parameter may raise the probability that the cell selection operation is reliable, but may waste resources in some applications.

Figure 5A:
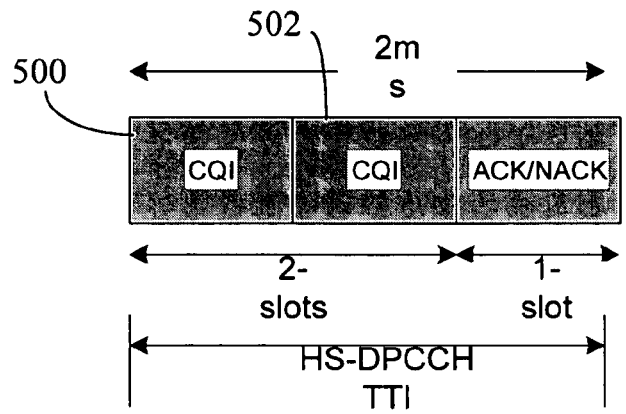
FIG. 5A illustrates a stylized representation of an HS-DPCCH TTI.

In one embodiment of the instant invention, the channel quality feedback in HSDPA consists of 5 information bits. This 5-bit channel quality indicator is coded using a (20,5) code and transmitted over two slots 500, 502 in an HS-DPCCH TTI as shown in FIG. 5A.

Figure 5B:
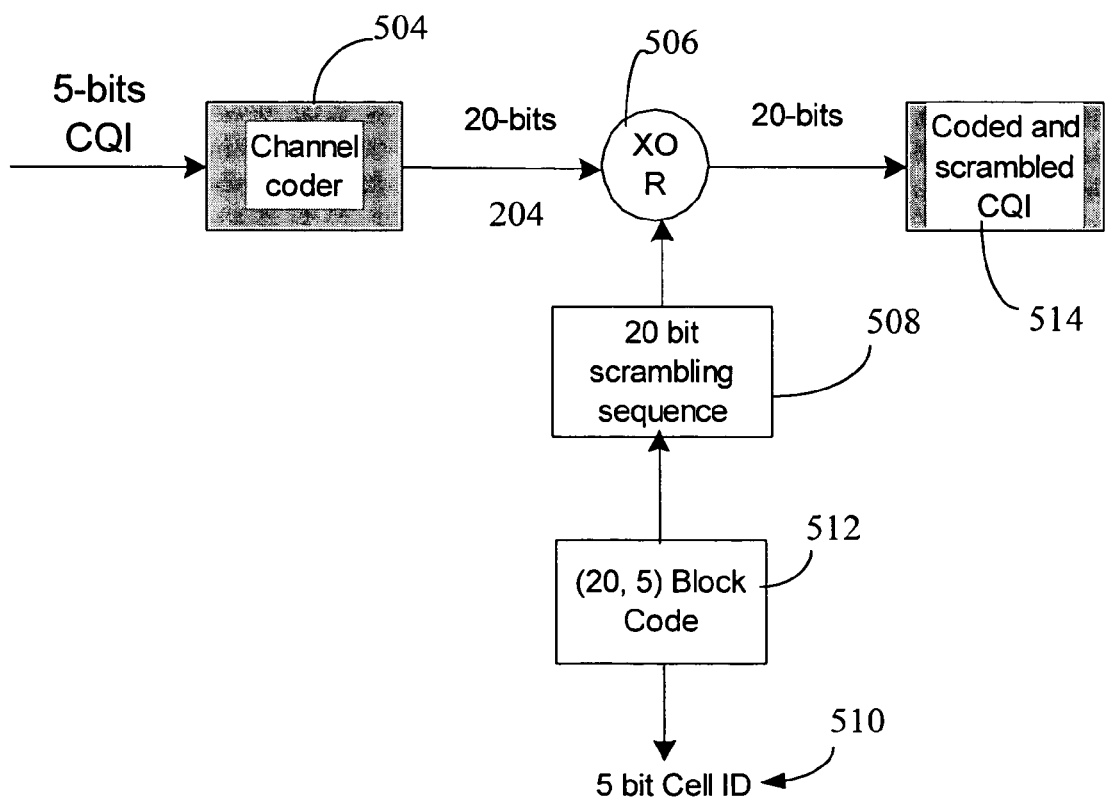
FIG. 5B illustrates a stylized representation of a methodology that may be used for coding and scrambling a CQI.

An example of CQI coding and scrambling is shown in FIG. 5B. The 20-bit CQI sequence after channel coding at block 504 is XORed at 506 with a 20-bit scrambling sequence 508. In one embodiment of the instant invention, the scrambling sequence can be generated by coding a 5-bit Cell ID 510 with another (20,5) code 512. The coded and scrambled CQI sequence 514 can then be transmitted on HS-DPCCH slots 500, 502. Since the CQI is scrambled with a cell specific scrambling sequence generated using the cell ID, only the targeted cell can decode the CQI.

Figure 6:
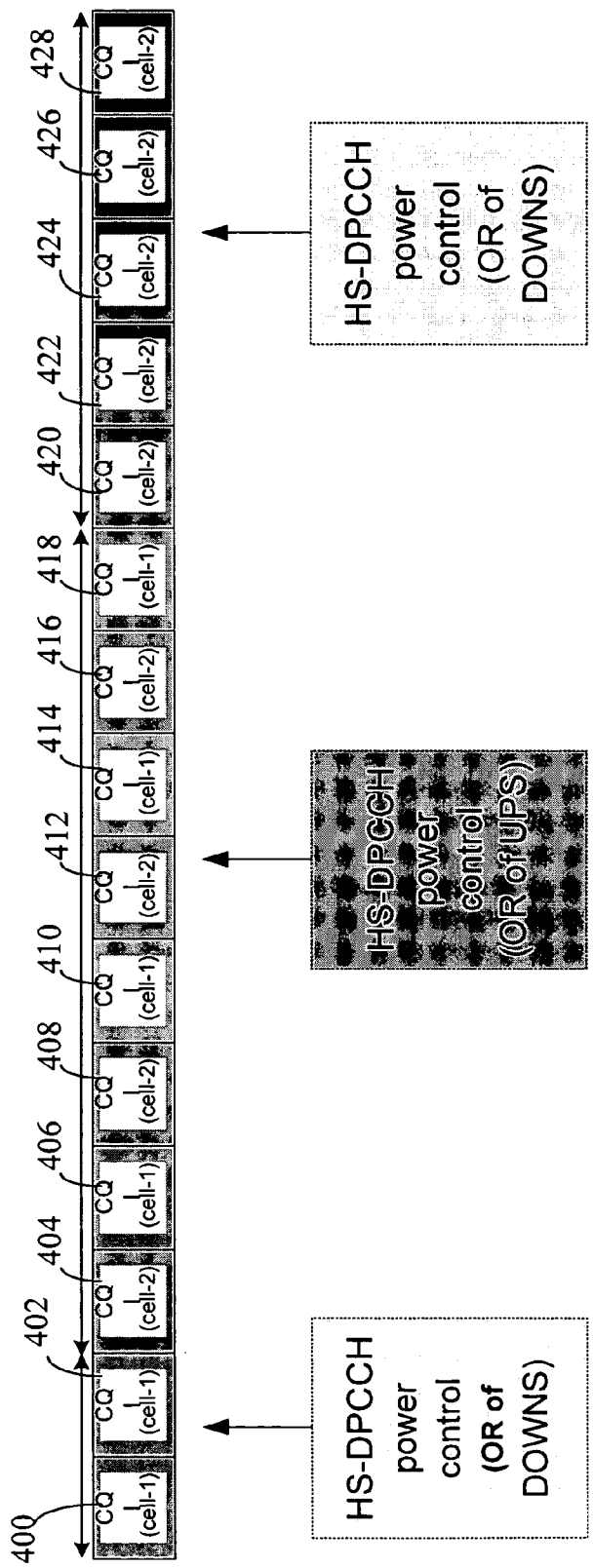
FIG. 6 illustrates a stylized representation of HS-DPCCH power control during cell switching.

A stylized representation of one embodiment of HS-DPCCH power control is shown in FIG. 6. The HS-DPCCH channel carries the CQI and the ACK/NACK feedback. The ACK/NACK information provides feedback for the Hybrid ARQ transmissions on the downlink. During periods when the mobile station 200 communicates with both the old and the new cells 202, 204, it is useful if the information carried over the HS-DPCCH is received reliably at both of the cells 202, 204. The CQI information is, for example, used for HS-PDSCH modulation and coding scheme selection and HS-SCCH power allocation on the downlink for transmissions from both of the cells 202, 204. Therefore, the CQI needs to be reliably received at both of the cells 202, 204. In the normal soft handoff power control operation of the uplink, the mobile station 200 uses an OR of DOWNs rule to control the amount of power used by the mobile station 200 during a transmission, i.e. the power is reduced if any of the cells in the active set sends a power DOWN command, such as during time slots 400-402 and 420-428. The idea with soft handoff is that at least one cell needs to reliably receive the information transmitted on the uplink at a give time because the transmissions received from multiple cells on the uplink go through selection combining in the RNC. Generally, as long as the transmission is successful on at least one cell, the information is received successfully. However, during the cell selection the CQI needs to be reliably received at both the new and the old cell 204, 202. Therefore, an OR of UPs rule can be set for HS-DPCCH power control, i.e. the mobile station 200 may increase its transmit power if any of the two cells (the old cell 202 or the new cell 204), is sending an UP command, such as during time slots 404-418. This will increase the likelihood that the HS-DPCCH is received reliably at both the cells 202, 204.

Figure 7:
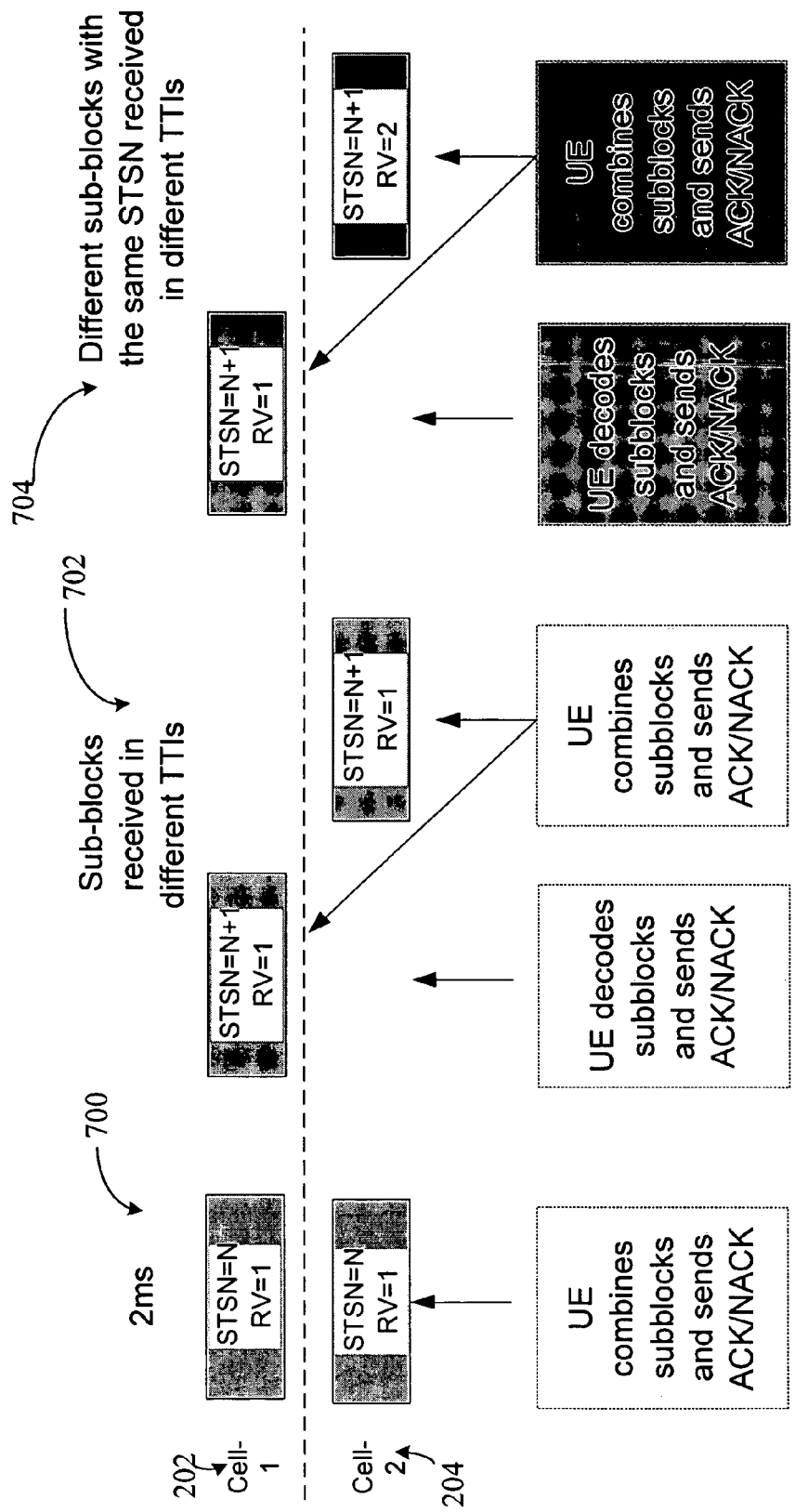
FIG. 7 illustrates a stylized representation of combining frames from two cells with which a mobile station is communicating.

An example of combining frames from the old cell 202 and the new cell 204 is shown in FIG. 7. A Short Transmission Sequence Number (STSN) derived from the Transmission Sequence Number (TSN) may be used to identify different information blocks. Generally, combining is performed for sub-blocks belonging to the same information block, i.e. sub-blocks with the same TSN or with the same STSN. The STSN, carried over the HS-SCCH, is used instead of TSN to reduce the overhead on HS-SCCH. If the sub-blocks from the two cells 202, 204 are received at the same time (within the same TTI, as indicated at 700), they can be combined and a single ACK or NACK signal can be sent, depending upon whether the transmission was successful or unsuccessful. It can also be noted that the sub-blocks from the same information block need not be received at the same time at the mobile station 200. The mobile station 200 can buffer the old unsuccessful sub-blocks received from either of the cells 202, 204 and combine the stored sub-blocks with the newly received sub-blocks from the same information block indicated by the same STSN. If the two blocks contain the same Redundancy Version (RV) as indicated at 702, a Chase combining operation can be performed on the received sub-blocks. However, if the sub-blocks from the two cells contain different RVs as indicated at 704, an Incremental Redundancy (IR) type of Hybrid ARQ combining may be performed.

Figure 8:
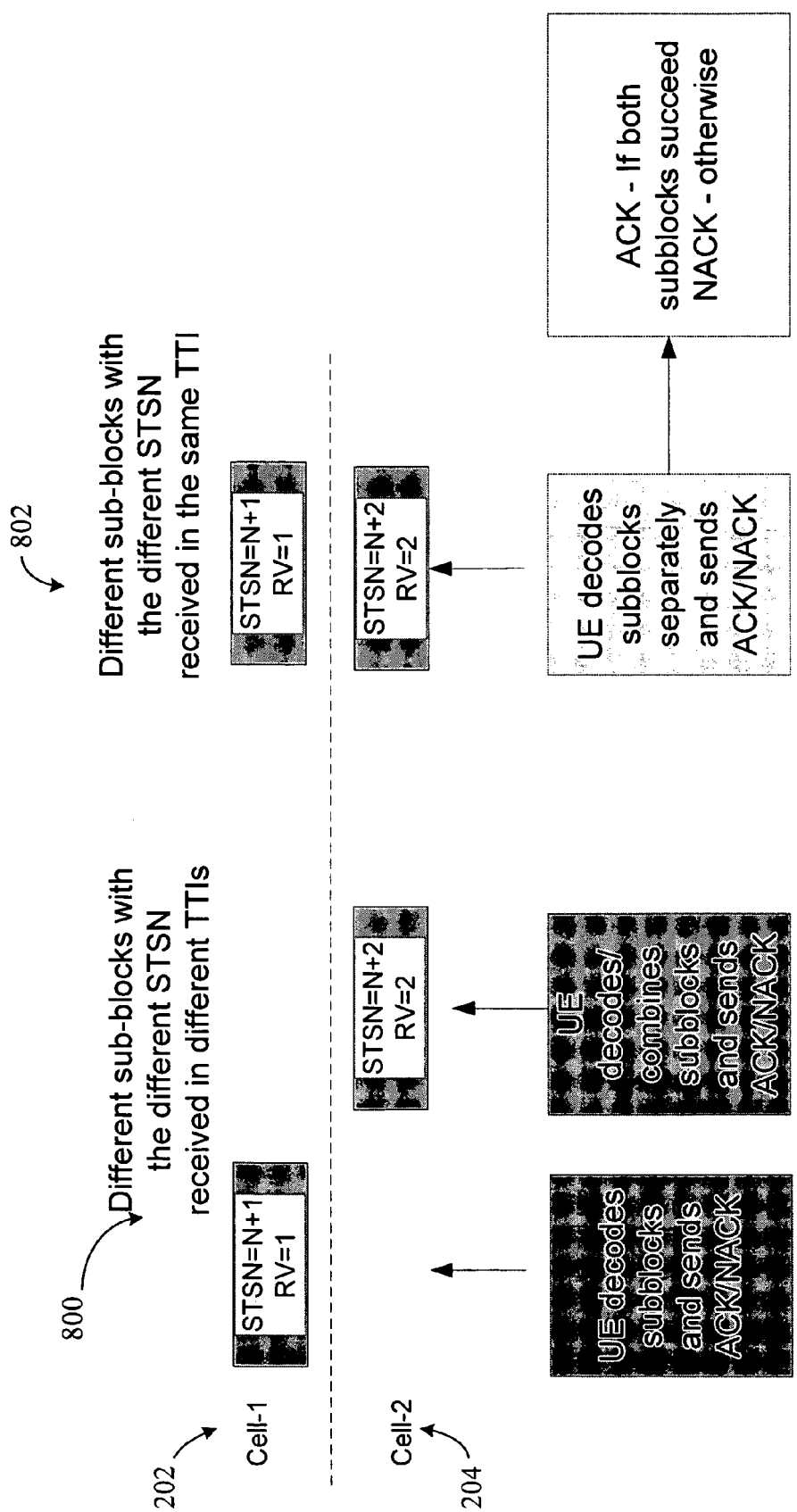
FIG. 8 illustrates a stylized representation of an alternative embodiment of combining frames from two cells with which a mobile station is communicating.

Another embodiment of the invention where the mobile station 200 receives sub-blocks with different STSNs is shown in FIG. 8. The sub-blocks with different STSNs are from different information blocks and, generally, are not combined in the decoding process. Therefore, the mobile station 200 decodes sub-blocks received with different STSNs separately and sends back ACK or NACK signals as indicated at 800, depending upon if the transmission was successful or unsuccessful. However, Hybrid ARQ combining may still be performed if there were previously stored sub-blocks with the same STSN as the currently received sub-block. In cases where two sub-blocks are received simultaneously from the two cells 202, 204 with different STSNs as indicated at 802, the mobile station 200 may send an ACK signal only if each of the two sub-blocks were successful. Otherwise, a NACK signal is sent even if one of the sub-blocks was successful. This is because a single ACK/NACK signal can be sent at a given time for a given received TTI. The ACK/NACK signal is then received at the two cells 202, 204. A separate ACK/NACK signal for each of the sub-blocks received from each of the cells 202, 204 can be sent if a capability to simultaneously transmit two ACK/NAC signals is available.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of communicating with at least a first and a second cell during a handoff from the first cell to the second cell, the method comprising:

transmitting, from a mobile unit, first information encoded with a first code such that the first cell can decode the first information;

transmitting, from the mobile unit, second information encoded with a second code, different than the first code, such that the second cell can decode the second information;

receiving, at the mobile unit, information from both the first and second cells for a time interval during which the first and second cells are able to concurrently decode the first and second information, respectively, wherein the time interval begins when the second cell has successfully decoded a first number of transmissions of said second information and ends after the mobile unit stops transmitting said first information.

2. A method, as set forth in claim 1, wherein transmitting the first and second information comprises delivering a first and second signal indicative of a quality of a communications channel between the mobile unit and the first and second cell.

3. A method, as set forth in claim 2, further comprising reducing power used to deliver the first and second signals in response to receiving a request from both the first and second cell.

4. A method, as set forth in claim 2, further comprising:
discontinuing transmission of said first information from the mobile unit to the first cell in response to successfully receiving information transmitted in a selected number of transmission time intervals from the second cell, and wherein the time interval ends when the first cell has failed to receive a second number of transmissions of said first information in response to the mobile unit to discontinuing transmission of said first information.

5. A method, as set forth in claim 2, wherein delivering the first and second signals indicative of a quality of a communications channel with the first cell and with the second cell further comprises encoding the first and second signals using first and second orthogonal code sequences.

6. A method, as set forth in claim 1, further comprising combining the information received from the first and second cells during the preselected period in which the first and second cells are able to concurrently decode the first and second information, respectively.

7. A method, as set forth in claim 6, wherein combining the information received from the first and second cells during the switching further comprises combining a first and second sub-block of information respectively received from the first and second cells provided that the first and second sub-blocks are from a common block of information.

8. A method, as set forth in claim 6, wherein combining the information received from the first and second cells during the switching further comprises combining a first and second sub-block of information respectively received from the first and second cells using Chase combining.

9. A method, as set forth in claim 6, wherein combining the information received from the first and second cells during the switching further comprises combining a first and second sub-block of information respectively received from the first and second cells using Chase combining provided that the first and second sub-blocks have a common redundancy version.

10. A method, as set forth in claim 6, wherein combining the information received from the first and second cells during the switching further comprises combining a first and second sub-block of information respectively received from the first and second cells using incremental redundancy combining.

11. A method of communicating with at least a first and a second cell during a handoff from the first cell to the second cell, the method comprising:
receiving, at a mobile unit, information only from the first cell in response to transmitting, from the mobile unit, first information encoded with a first code such that the first cell can decode the first information;
switching from communicating with the first cell to communicating with the second cell;
receiving information from both the first and second cells for a time interval during the switching in response to transmitting, from the mobile unit, the first information encoded with the first code concurrently with transmitting, from the mobile unit, second information encoded with a second code, different than the first code, such that the second cell can decode the second information, wherein the time interval begins when the second cell has successfully decoded a first number of transmissions of said second information and ends after the mobile unit discontinues transmitting said first information; and
receiving information only from the second cell after the switching in response to discontinuing transmission of the first information encoded with the first code.

12. A method, as set forth in claim 11, further comprising:
delivering a first signal indicative of a quality of a communications channel with the first cell prior to the switching;
delivering a second signal indicative of a quality of a communications channel with the second cell after the switching; and
delivering the first and second signals indicative of a quality of a communications channel with the first cell and with the second cell during the switching.

13. A method, as set forth in claim 12, further comprising discontinuing delivery of the first signal in response to receiving information from the second cell for a preselected period.

14. A method of communicating with a mobile station through at least a first and a second cell during a handoff from the first cell to the second cell, comprising:
switching from communicating with the mobile station via the first cell to communicating with the mobile station via the second cell;
transmitting information through both the first and second cells to the mobile station for a time interval during the switching the time interval corresponding to a period when the mobile station is concurrently transmitting first information encoded with a first code such that the first cell can decode the first information and second information encoded with a second code, different than the first code, such that the second cell can decode the second information, wherein the time interval begins when the second cell has successfully decoded a first number of transmissions of said second information and ends after the mobile unit stops transmitting said first information.

15. A method, as set forth in claim 14, further comprising receiving a first and second signal indicative of a quality of a communications channel between the mobile station and the first cell and the second cell during the switching.

16. A method, as set forth in claim 15, further comprising discontinuing delivery of the information from the first cell in response to failing to receive the first signal for a preselected period.

17. A method, as set forth in claim 15, wherein delivery of the information from the second cell is initiated in response to receiving the second signal for a preselected period.

18. A method, as set forth in claim 15, wherein receiving the first and second signals indicative of the quality of the communications channel with the first cell and with the second cell during the switching further comprises decoding the first and second signals wherein the first signal may be decoded by the first cell and the second signal may be decoded by the second cell.

* * * * *